United States Patent
Zampaglione et al.

(10) Patent No.: US 9,529,669 B2
(45) Date of Patent: Dec. 27, 2016

(54) ERROR DETECTION AND CORRECTION IN BINARY CONTENT ADDRESSABLE MEMORY (BCAM)

(71) Applicant: eSilicon Corporation, San Jose, CA (US)

(72) Inventors: Michael Anthony Zampaglione, San Jose, CA (US); Thomas Robert Wik, Livermore, CA (US)

(73) Assignee: eSilicon Corporation, San Jose, CA (US)

( * ) Notice: Subject to any disclaimer, the term of this patent is extended or adjusted under 35 U.S.C. 154(b) by 77 days.

(21) Appl. No.: 14/502,966

(22) Filed: Sep. 30, 2014

(65) Prior Publication Data
US 2015/0095740 A1    Apr. 2, 2015

Related U.S. Application Data

(60) Provisional application No. 61/884,694, filed on Sep. 30, 2013.

(51) Int. Cl.
G11C 29/00     (2006.01)
G06F 11/10     (2006.01)

(52) U.S. Cl.
CPC ................. G06F 11/1068 (2013.01)

(58) Field of Classification Search
CPC . G06F 11/1068; G06F 11/106; G06F 11/1666; G06F 11/1064; G11C 15/04; G11C 2029/0411; G11C 15/00; G11C 11/4125; G11C 15/046; G11C 15/043; G11C 29/42; G11C 29/44; G11C 29/20; G11C 2029/1208; G11C 2029/3602; H03M 13/09
See application file for complete search history.

(56) References Cited

U.S. PATENT DOCUMENTS

| | | |
|---|---|---|
| 7,170,769 B1 | 1/2007 | Sachan et al. |
| 7,254,748 B1 | 8/2007 | Wright et al. |
| 7,257,763 B1 * | 8/2007 | Srinivasan .......... G06F 11/1064 714/718 |
| 7,260,673 B1 * | 8/2007 | Ross ..................... G11C 15/00 365/49.15 |
| 7,304,874 B2 | 12/2007 | Venkatraman et al. |
| 7,570,503 B1 | 8/2009 | Maheshwari |
| 2003/0007408 A1 * | 1/2003 | Lien .................... G11C 11/4125 365/222 |
| 2007/0061692 A1 | 3/2007 | Wickeraad |
| 2007/0061693 A1 | 3/2007 | Wickeraad |

(Continued)

*Primary Examiner* — Guerrier Merant
(74) *Attorney, Agent, or Firm* — Fenwick & West LLP

(57) ABSTRACT

A binary content addressable memory (BCAM) is disclosed. The BCAM includes a memory array, data signature circuitry, and a data match module and compare circuitry. The memory array is configured to store a data entry for a data word and a corresponding data signature for the data entry. The data signature circuitry is configured to calculate the data signature for the data entry and to calculate the data signature for an input word. The data match module compares the data entry to the input word to produce a content match output, and compares the data signature for the data entry to the data signature of the input word to produce a signature match output. The compare circuitry compares the content match output and the data signature match output.

19 Claims, 6 Drawing Sheets

(56) References Cited

U.S. PATENT DOCUMENTS

2012/0110411 A1* 5/2012 Cheung ................ G06F 11/106
   714/758
2015/0095740 A1 4/2015 Zampaglione et al.

* cited by examiner

ERROR DETECTION AND CORRECTION IN BINARY CONTENT ADDRESSABLE MEMORY (BCAM)

CROSS REFERENCE TO RELATED APPLICATIONS

This application claims the benefit of U.S. Provisional Application No. 61/884,694, filed Sep. 30, 2013, which is incorporated by reference in its entirety.

BACKGROUND OF THE INVENTION

1. Field of the Invention

This invention relates generally to content addressable memory (CAM). More particularly, it relates to real-time error detection and correction in binary content addressable memory (BCAM).

2. Description of the Related Art

Content addressable memory (CAM) is a type of memory unit in which the data stored is addressable by its content. During a compare operation, the CAM compares an input word with the words stored in the CAM. The CAM determines whether each entry is a match or a mismatch to the input word. If a match to the input word is found, the CAM may return a list of one or more storage addresses of the entries that matched the input word and/or one or more data words associated with the entries that matched the input word.

A binary CAM (BCAM) is a type of CAM in which matching is based on matching all of the bits in the data entry. That is, none of the bits are masked or don't care, as might be the case in a ternary content addressable memory.

Errors may be introduced into entries in a BCAM (e.g., by ionizing radiation). In certain applications, the soft error rates (SER) in BCAMs can exceed acceptable limits for many applications given the large number of bits stored by BCAMs.

SUMMARY OF THE INVENTION

The present invention overcomes the limitations of the prior art by providing data signature circuitry, (e.g., error correction circuitry) and/or duplicate entries to entries in a BCAM. When performing a compare operation in a BCAM, the data signatures of the input word and the data entry being considered may also be analyzed to determine whether an error has occurred. When duplicate entries are used, the results of the compare operation of an entry can be compared to the results of the compare operation of the corresponding duplicate entry to determine whether an error has occurred.

In cases where error correction circuitry is provided, it can be used to correct errors in an entry of the BCAM. Depending on the error correcting code used by the BCAM, single bit errors or multiple bit errors may be detected and/or corrected without the need of retrieving the data to be corrected from an external source.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1A:
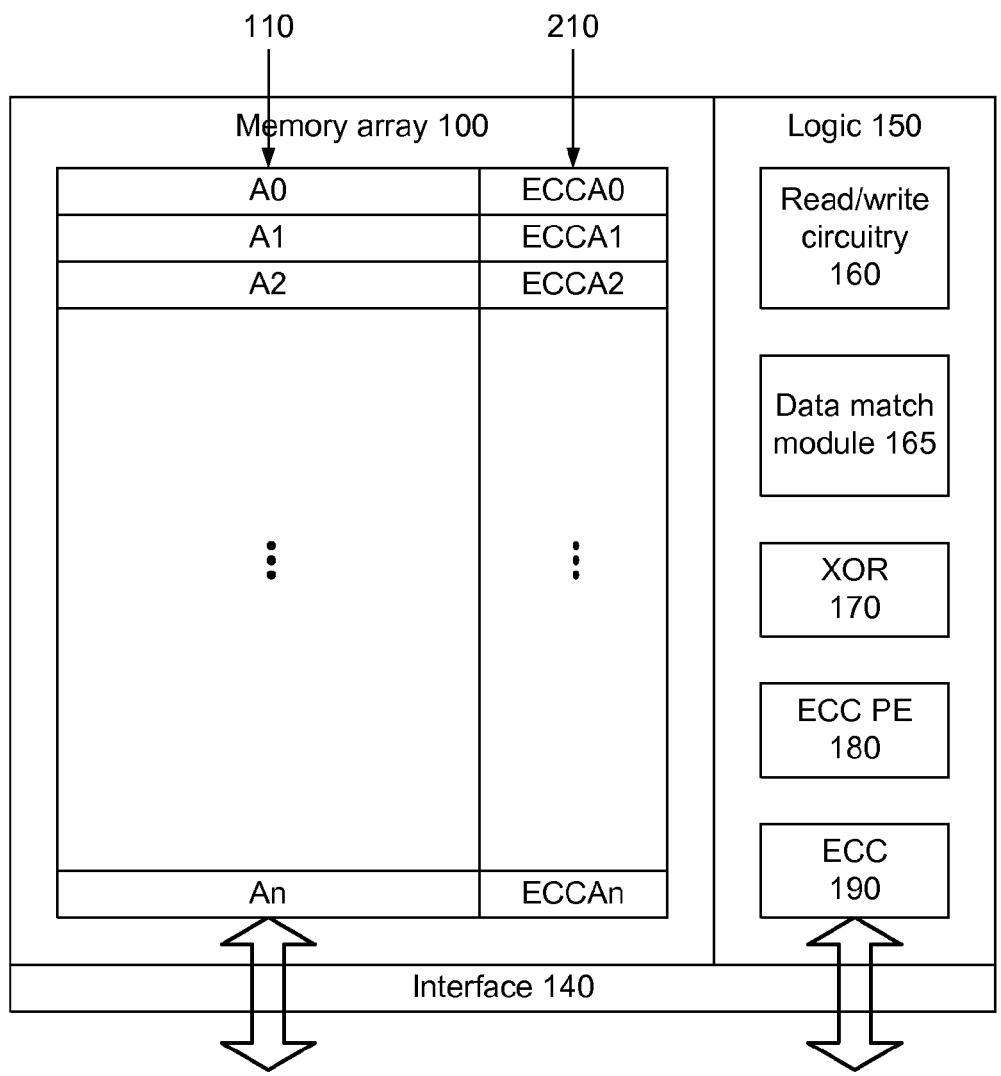
FIG. 1A is a block diagram of a binary content addressable memory (BCAM) with data signatures, according to one embodiment of the invention.

FIG. 1A is a block diagram of a BCAM with data signatures, according to one embodiment of the invention. The BCAM of FIG. 1A includes a memory array 100, auxiliary logic circuitry 150 and an interface 140. The memory array 100 contains data organized as words (which are shown as rows in FIG. 1A). The interface 140 provides an interface for communication between the BCAM and other components.

For purposes of illustration, assume that the BCAM is used to store 144-bit data words. These data entries 110 are denoted as A0, A1, etc. in FIG. 1A. In FIG. 1A, the BCAM also stores a corresponding data signature 210 for the data entries 110. In this example, assume that the data signatures 210 are 9-bit Hamming codes (which are error correcting codes), denoted by ECCA0, ECCA1, etc.

The logic circuitry 150 includes read/write circuitry 160, a data match module 165, XOR circuitry 170 (or other compare circuitry), a error correction code priority encoder (ECC PE) 180, and error correction circuitry 190 (or other data signature circuitry). The read/write circuitry 160 reads data from the memory array 100 and writes data to the memory array 100, via the interface 140. The read/write circuitry 160 may also read and write data not shown in FIG. 1A. For example, data entry 110 may be an index to other data words. The read/write circuitry 160 may also read and write those other data words.

In the example shown in FIG. 1A, assume that the BCAM requires one cycle to read one physical 144-bit word and one cycle to write one physical 144-bit word. In that case, writing a data entry 110 would require one cycle. Upon writing data to the memory array 100, the ECC circuitry 190 calculates the corresponding EEC data 210 which is also stored in the memory array. For example, when the 144 bits of row A0 are written to the memory array 100, the ECC circuitry 190 calculates the 9 bit Hamming code which is written as ECCA0 to the memory array.

Reading the data stored in data entry 110 would also require one cycle. Upon readout, the ECC code 210 can also be checked as part of readout. For example, upon readout of row A0, that data may be checked by the ECC circuitry 190 against ECCA0 to confirm the integrity of the data. If an error is indicated, the ECC circuitry 190 may be able to correct the error (e.g., in the case of 1-bit errors for the Hamming code example) or may simply flag the error for correction elsewhere.

The content comparison function of the BCAM is performed by the data match module 165. The data match module 165 compares the data entries 110 to an input word. In some embodiments, the data match module 165 compares an input word to every data entry 110 of the BCAM in parallel and generates a match output for every data entry 110 indicating whether the input word matched the data entry.

Figure 1B:
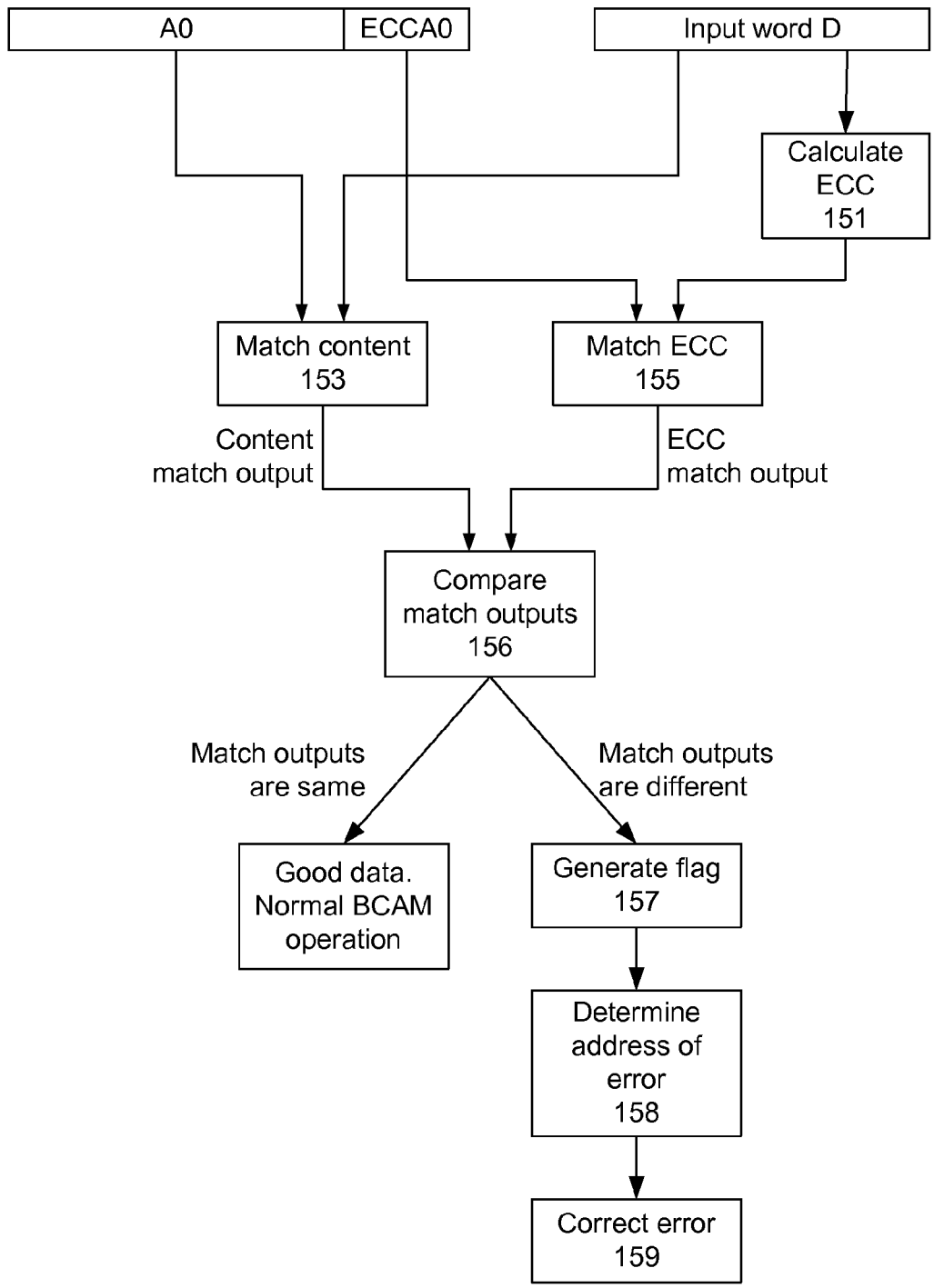
FIG. 1B is a flow chart showing steps for determining in real-time, whether an entry in a BCAM is corrupted, according to one embodiment of the invention.

The data signatures 210 can be used to facilitate the real-time detection of errors in the memory array 100, as shown in FIG. 1B. This might occur, for example, if bits are flipped due to ionizing radiation. In FIG. 1B, input word D is received by the BCAM. It is compared 153 to a data entry (A0, for example). The data signature for input word D is also calculated 151 and that is compared 155 to the data signature (ECCA0) for the data entry. The data match module 165 performs both of these comparisons 153,155.

The outputs of the two compare operations 153,155 are compared 156 by the XOR 170 to determine whether the two match operations 153,155 produced the same result. Table 1 below is a truth table listing the possible results. Depending on the algorithm used to generate the data signature, there might be a small chance that two different data words could legitimately produce the same data signature. For instance, two 144-bit data words may share the same 9-bit hamming code.

TABLE 1

Comparison of match outputs

| Content match output | ECC match output | XOR | Action. Notes. |
|---|---|---|---|
| 1 | 1 | 0 | Normal BCAM operation for content match. Input data word D matches data entry A0, and corresponding ECC codes also match. |
| 0 | 0 | 0 | Normal BCAM operation for content mismatch. Input data word D does not match data entry A0, and corresponding ECC codes also do not match. |
| 1 | 0 | 1 | Error. Input data word D matches data entry A0, but corresponding ECC codes do not match. |
| 0 | 1 | 1 | Possible Error. Input data word D does not match data entry A0, but corresponding ECC codes do match. |

As shown in the first two rows of Table 1, if the XOR 170 indicates that the two match outputs are the same, then the BCAM continues its normal operation. If both match outputs=1, this means that the input word D is the same as the data entry A0. Furthermore, ECCD is also the same as ECCA0, which is what is expected. Therefore, this confirms the validity of the match between D and A0, and the BCAM continues operation assuming that a valid content match has been found.

If both match outputs=0, this means that the input word D is different than the data entry A0. Furthermore, ECCD is also different than ECCA0, which is a normal condition since the two underlying data words are different. Again, the BCAM appears to be operating normally without errors, although in this case no valid content match has been found.

If the XOR 170 indicates that the two match outputs are different, then these are abnormal cases that indicate possible error. In these cases, a flag may be set 157 indicating the presence of a possible error. The ECC PE 180 may determine 158 the address of the mismatch. That is, ECC PE 180 determines the address of A0 so that the possible error can be resolved. In one approach, the address determined by the ECC PE 180 is used to correct 159 the detected error. For example, uncorrupted data may be retrieved from an external data source and reloaded to the data entry 110. The BCAM content compare can then be run again against the good data entries. Alternately, the ECC circuitry 190 may perform a scrub operation to correct or detect the error. For example, data entry A0 may be checked by the ECC circuitry 190 against the corresponding error code ECCA0 to correct and/or identify errors. If the encoding/decoding of error bits takes a long time, this operation may also be pipelined. The BCAM can be designed so that flagging 157 a possible error occurs as part of the BCAM content comparison function. In this way, possible errors are flagged early, which leads to earlier correction of those errors. This in turn reduces the delay in completing the BCAM content comparison function.

The XOR mismatch has two possibilities. In one case, the input data word D matches data entry A0, but the corresponding ECC codes do not match. This is not possible without an error somewhere. If D and A0 are the same, then their ECC codes must also be the same. In the other case, the input data word D does not match data entry A0, but the corresponding ECC codes do match. This is not necessarily an error. It is possible for two different 144-bit words D and A0 to have the same 9-bit ECC code.

If XOR 170 indicates that the two match outputs are different, the ECC circuitry 190 may apply the data signature (ECCA0) to the data entry A0 to determine whether the data entry A0 contains an error and/or correct an error present in data entry A0. For instance, if ECC circuitry 190 determines that data entry A0 has a correctable error (e.g., a 1-bit error), ECC circuitry 190 corrects the data entry A0 using the data signature ECCA0. If ECC circuitry 190 determines that the data entry A0 has a non-correctable error (e.g., a 2-bit error), ECC circuitry 190 may flag the data entry A0 as containing a non-correctable error or may output an error signal indicating that the data entry A0 has a non-correctable error. Alternatively, ECC circuitry 190 may retrieve the data word that was stored in data entry A0 from an external source.

Even if the ECC circuitry 190 determines that the data entry A0 contains valid data, the TCAM may perform a scrub operation to identify and fix possible single-bit errors that may be present in the TCAM before they become a two-bit error.

Figure 2:
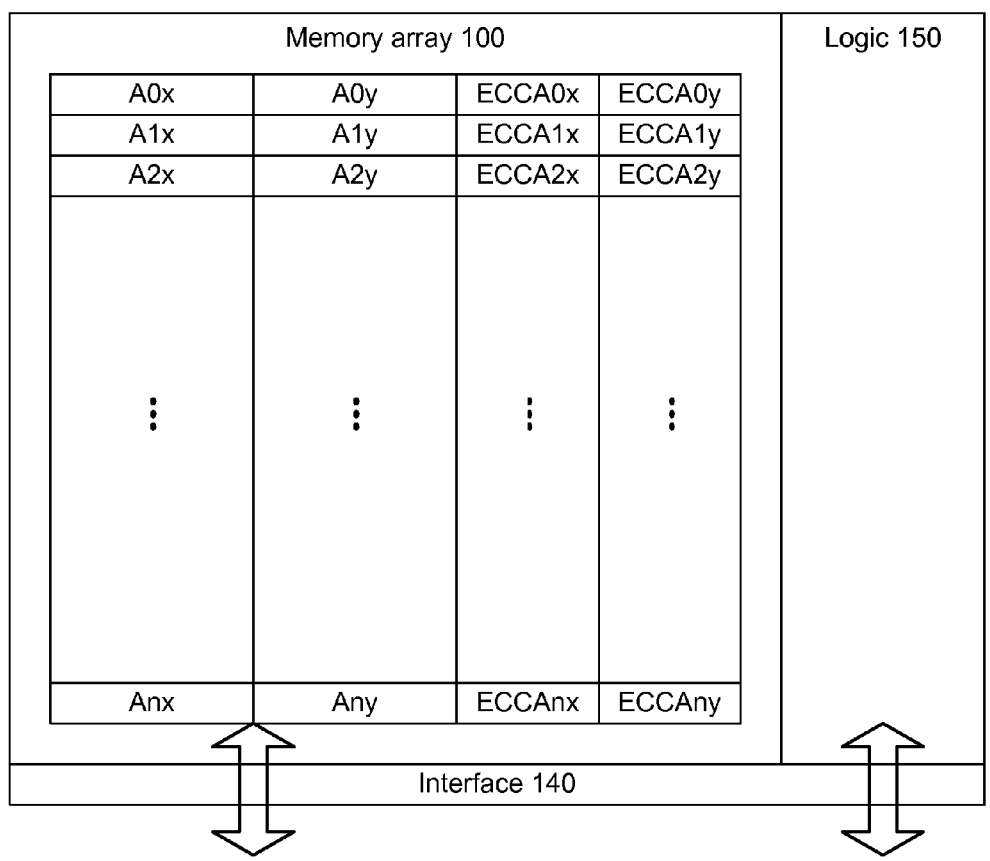
FIG. 2 is a block diagram of a BCAM with sub-divided data entries, according to another embodiment of the invention.

To decrease the likelihood of multiple bit errors, the entries of the BCAM may be divided into multiple segments, as shown in FIG. 2. In this example, each data entry is divided into two sub-entries, each associated with its own ECC data. The old data entry A0 is divided into sub-entries A0x and A0y. The ECC code for A0x is stored as ECCA0x, and the ECC code for A0y is stored as ECCA0y. By doing this, the BCAM is able to correct single bit errors and detect double bit errors in each sub-entry. Additionally, the bits of the data rows and/or sub-entries may be physically placed in locations that reduce the likelihood of double bit errors.

Note that FIGS. 1-2 use error correction (specifically, Hamming code) as an example, but that is not required. Other error correcting codes that are capable of detecting and/or correcting one or more bit errors may be used. In addition, the data signatures 210 can be other types of data signatures which do not have error correction features. For example, the data signatures 210 could be one-way hashes of the corresponding data entries 110.

Figure 3A:
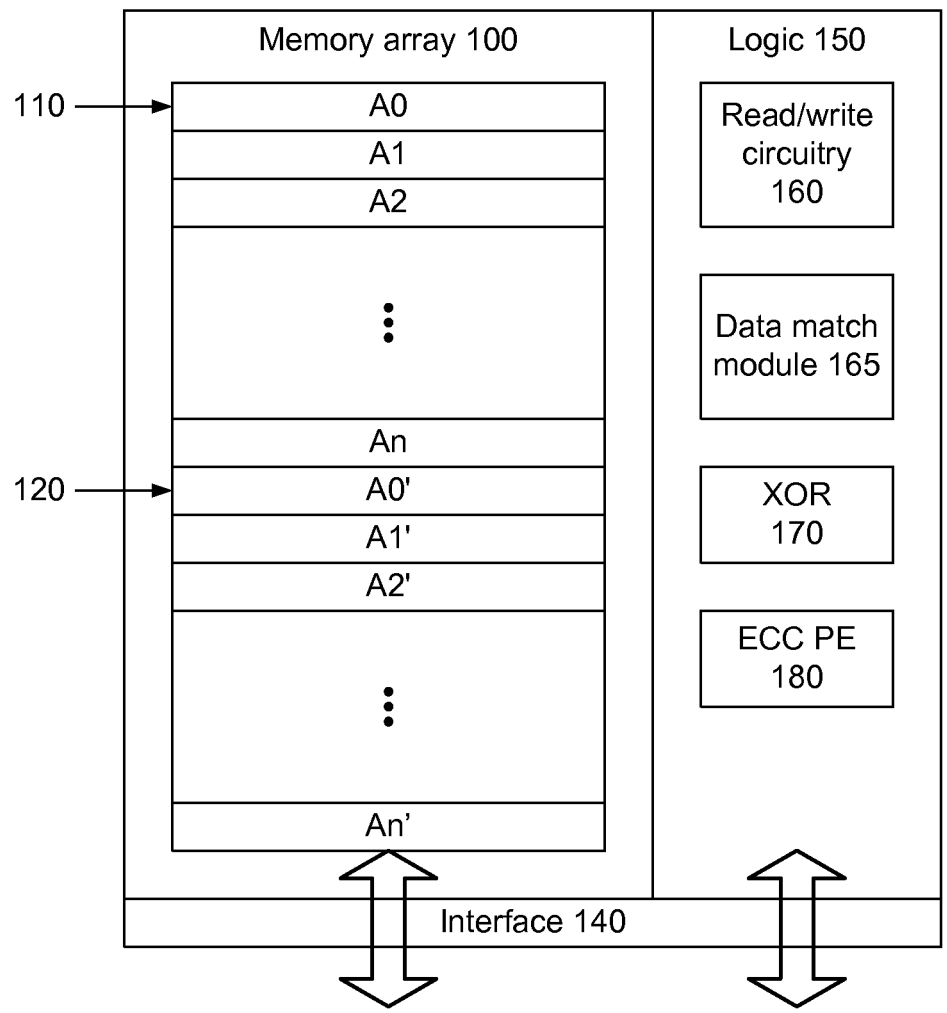
FIG. 3A is a block diagram of a BCAM with duplicate entries, according to one embodiment of the invention.

In another aspect, FIG. 3A is a block diagram of a BCAM with duplicate entries, according to one embodiment of the invention. The BCAM of FIG. 3A is similar to the one in FIG. 1A, except that this BCAM does not have ECC circuitry (and does not store signature data 210). However, it does store duplicate data entries 120. The duplicate entries are denoted by the ' symbol. Thus, A0' is a duplicate entry of A0, A1' is a duplicate entry of A1, and so on. FIG. 3A shows a logical arrangement of the memory array. Different physical layouts are possible. For example, in some embodiments, to decrease the likelihood of both the data entry 110 and the duplicate data entry 120 being affected by the same ionizing radiation event, the duplicate entry 120 is physically separated from the corresponding base entry 110 by at least a minimum spacing (e.g., separated by at least four data entries).

Figure 3B:
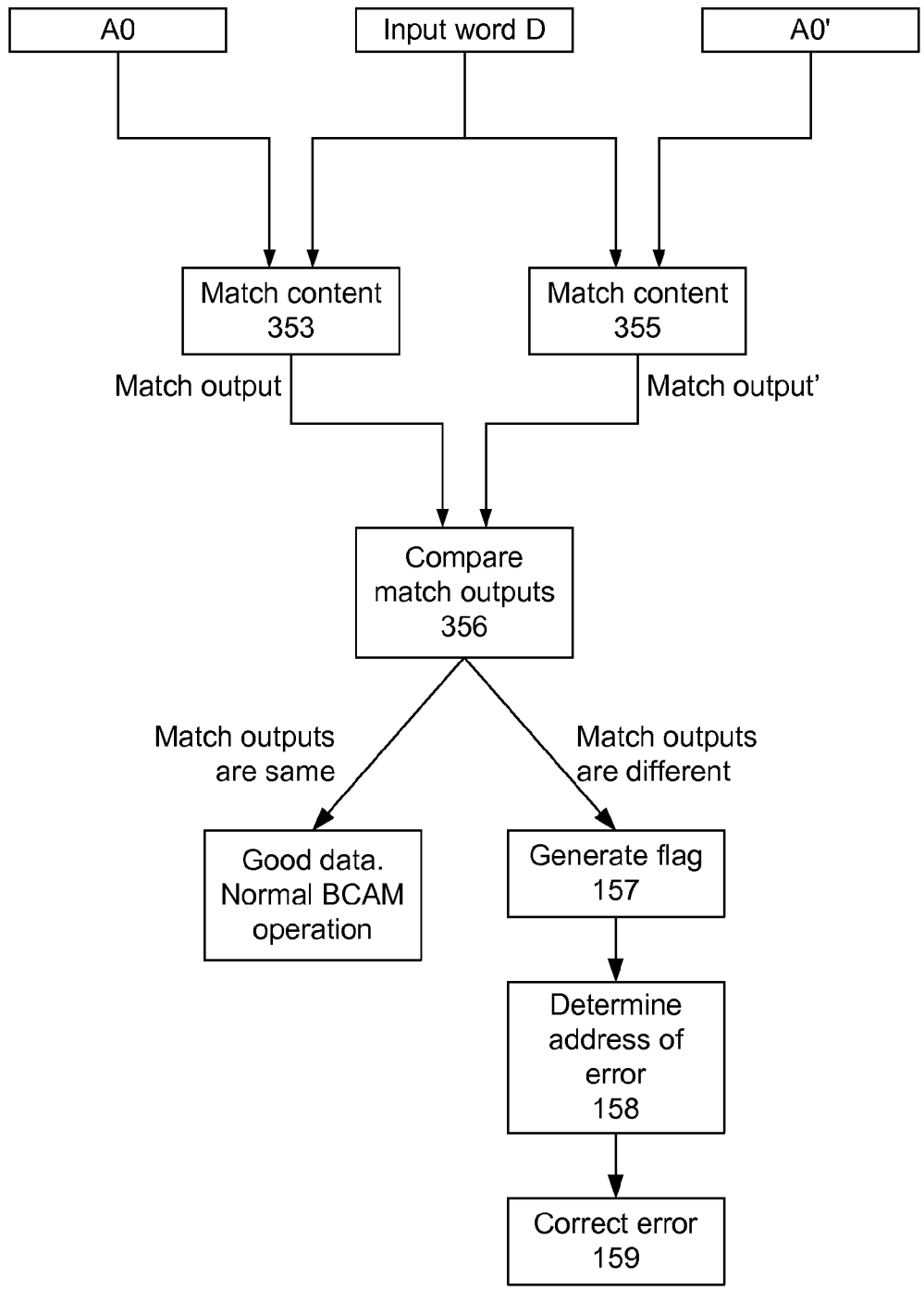
FIG. 3B is a flow chart showing steps for determining in real-time, whether an entry in a BCAM is corrupted, according to one embodiment of the invention.

The duplicate data entries can be used to facilitate the real-time detection of errors in the memory array 100, as shown in FIG. 3B. This might occur, for example, if bits are flipped due to ionizing radiation. In FIG. 3B, input word D is received by the BCAM. It is compared 353 to a data entry (A0, for example) and also compared 355 to its corresponding duplicate data entry (A0').

The outputs of the two compare operations 353,355 are compared 356 by the XOR 170 to determine whether the two match operations 353,355 produced the same result. Since the data entry 110 and corresponding duplicate data entry 120 should be the same, the outputs of their compare operations to the input word should also be the same. If XOR determines that this is the case, then the BCAM can operate as normal since the data entries are good. Otherwise, if the XOR 170 determines that there is a mismatch between the outputs of the two compare operations, a flag may be set 157 indicating the presence of an error in either the data entry 110 or in the corresponding duplicate data entry 120. As in FIG. 1A, the ECC PE 180 may determine 158 the address of the inconsistent compare operation result, in order to correct 159 the detected error.

Figure 4:
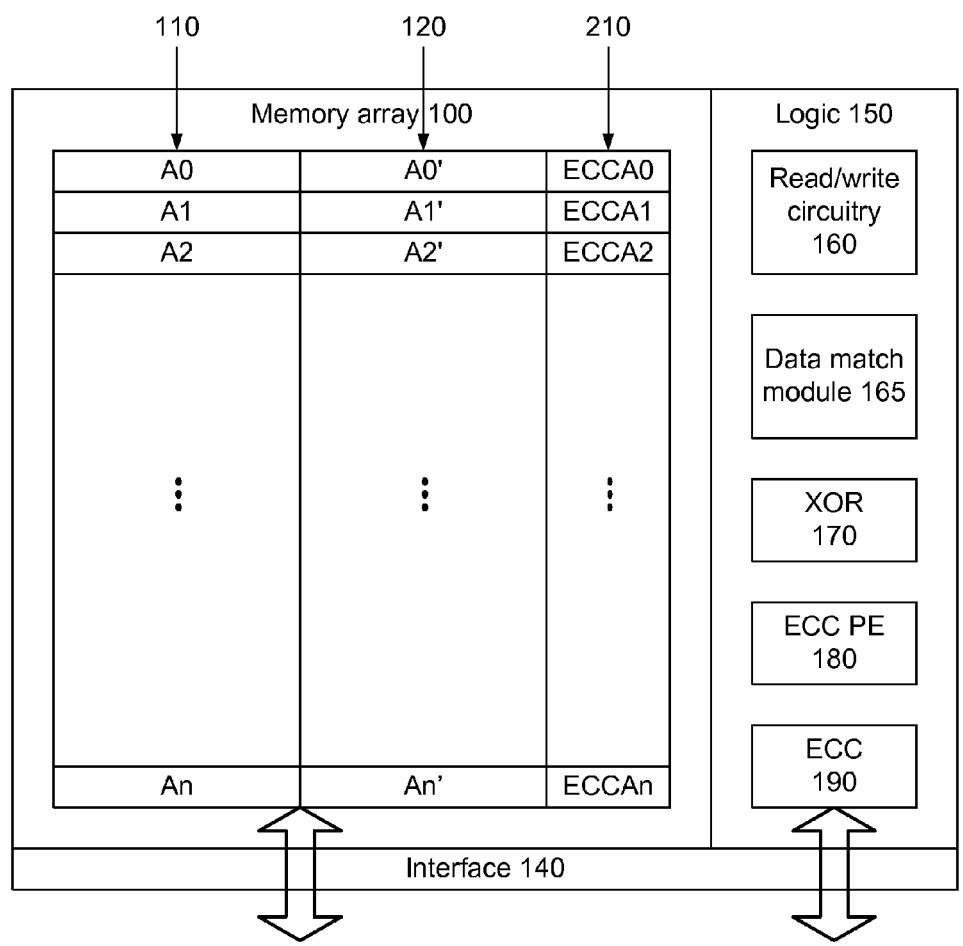
FIG. 4 is a block diagram of another BCAM, according to one embodiment of the invention.

The data signatures techniques shown in FIGS. 1-2 and the duplicate data entry techniques shown in FIG. 3A may also be combined. FIG. 4 is a block diagram of a BCAM that uses both. In this example, the data entries 110 and their duplicates 120 are stored in the same row. A single ECC data 210 is used for both. In one implementation, ECCA0 is the 9-bit Hamming code for the 144-bits A0. Since A0' is a duplicate of A0 (at least initially, upon writing to the BCAM), the same 9-bit ECCA0 is also the Hamming code for A0'. In an alternate design, A0 and A0' are treated as a single 288-bit word and ECCA0 is the Hamming code for the 288-bit word. Other implementations may use other arrangements of duplicate data entries and/or data signatures internal to the BCAM.

Certain implementations advantageously enable the real-time detection of errors in entries of a BCAM. The use of duplicate data entries 120 allow the detection of errors that otherwise would not be detected in real-time. Additionally, the storage of data signatures 210 within the BCAM enable local correction and/or detection of errors without the need to retrieve the uncorrupted data from an external source. As a result, the error correction and detection features are self contained in a BCAM module without the need of external modules or components. One advantage of implementing the duplicate data entries 120 and/or the ECC data 210 and associated logic circuitry internally to the BCAM is that operations can be done internally within the BCAM, without the overhead of having to cross the interface 140.

In another aspect, BCAMs may be provided as macro blocks for inclusion into larger chip designs. Thus, one company may be designing a chip that requires BCAMs. Instead of designing the BCAMs itself, the company (customer) licenses BCAM macro blocks from an IP vendor. The IP vendor may provide a BCAM macro block that already provides for the duplicate data entries 120 and/or the signature data 210 and associated logic circuitry. This will save the customer time because he does not have to design these components or integrate them with a BCAM that does not have them. The IP vendor may also be able to come up with better overall designs since he may be able to better integrate the duplicate data entries 120 and/or the signature data 210 with the rest of the BCAM.

In some embodiments, the IP vendor may provide a BCAM compiler to generate the design of a BCAM based on parameters specified by the customer. For instance, the customer may specify the number of bits per word, the number of entries or words in the BCAM, etc. The customer may also specify if error detection and/or correction is desired. The memory compiler then generates the data entries 110, the duplicate data entries 120 and/or the ECC data 210 and associated logic circuitry.

In some implementations of the BCAM, certain logic components may be implemented as macro blocks, which typically are laid out by hand and provided by the IP vendor. Other components may be implemented as a wrapper, which typically is synthesized from RTL and may be provided by either the IP vendor or the customer. For instance, the read/write circuitry 160, the data match module 165, and the XOR 170 may be included as part of a BCAM macro block, while the ECC PE 180 may be included as part of the wrapper. In another example, the ECC 190 may also be included in the wrapper. In yet another example, the read/write circuitry 160, the data match module 165, the XOR 170, the ECC PE 180, and the ECC 190 are all included in the BCAM macro block.

In yet another aspect, the BCAM compiler may generate a single word to store the data entry 110,120 and the ECC data 210. For instance, if the data entry 110,120 is 144-bits long, and the ECC data 210 is 9-bits long, the BCAM compiler may generate a 153-bits long row to store both the data entry 110,120 and the ECC data 210. In another embodiment, the ECC data 210 may be stored in a word that is separate from the data entries 110,120. For instance, two memory arrays, one 144-bits wide and another 9-bits wide may be included to store the data entries 110,120 and the ECC data 210 respectively.

If the a single row is used to store the data entry 110 and the duplicate data entry 120, the BCAM compiler may generate a single word to store the data entry 110, the duplicate data entry 120, and the ECC data 210. For instance, if the data entry 110 and duplicate data entry 120 are 144-bits long, and the ECC data 210 is 9-bits long, the BCAM compiler may generate a 297-bits long row to store the data entry 110, the duplicate data entry 120, and the ECC data 210.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention.

What is claimed is:

1. A binary content addressable memory (BCAM) comprising:

a memory array configured to store a data entry for a data word and a corresponding data signature for the data entry;

data signature circuitry configured to calculate the data signature for the data entry, and to calculate a data signature for an input word;

a data match module configured to compare the data entry to the input word to produce a content match output, and to compare the data signatures for the data entry and for the input word to produce a data signature match output; and compare circuitry configured to compare the content match output and the data signature match output.

2. The BCAM of claim 1 wherein:

the data signature circuitry comprises error correction code (ECC) circuitry configured to calculate ECC data for the data entry and for the input word;

the data match module compares the ECC data for the data entry and for the input word to produce the data signature match output; and the ECC circuitry is further configured to apply error correction to the data entry using the ECC data calculated for the data entry, if the compare circuitry indicates a mismatch between said match outputs and the ECC circuitry detects a correctable error in the data entry.

3. The BCAM of claim 2, wherein the BCAM retrieves a data word for the data entry from an external source and replaces the data entry with the retrieved data word, if the compare circuitry indicates a mismatch between said match outputs and the ECC circuitry detects a non-correctable error in the data entry.

4. The BCAM of claim 2, wherein the ECC circuitry is configured to correct a one bit error on the data entry and at least detect a two bit error on the data entry.

5. The BCAM of claim 1, wherein the compare circuitry outputs a match signal responsive to the content match output indicating a match and the data signature match output indicating a match.

6. The BCAM of claim 1, wherein the compare circuitry outputs an error signal responsive to the comparison between the content match output and the data signature match output indicating a mismatch between said match outputs.

7. The BCAM of claim 6, further comprising:

an address decoder configured to determine an address of the data entry responsive to receiving the error signal.

8. The BCAM of claim 1, wherein if the compare circuitry indicates a mismatch between said match outputs, the BCAM takes corrective action and then retries comparison of the data entry to the input word.

9. The BCAM of claim 8, wherein the corrective action comprises correcting the data entry.

10. The BCAM of claim 1, wherein the data signature circuit calculates and stores the data signature for the data entry during a same cycle for storing the data entry in the memory array.

11. A method for detecting, in real-time, possible errors in a content comparison function of a binary content addressable memory (BCAM), the method comprising the following steps performed within the BCAM:

receiving an input word;

comparing the received input word to a data entry stored in the BCAM to produce a content match output;

calculating a data signature for the input word;

retrieving a data signature previously calculated for the data entry;

comparing the data signatures for the data entry and for the input word to produce a data signature match output;

comparing the content match output and the data signature match output; and if the comparison of said match outputs indicates a mismatch between said match outputs, indicating a possible error in the content comparison function of the BCAM for the data entry.

12. The method of claim 11 further comprising:

if the comparison of said match outputs indicates a mismatch between said match outputs, applying an error correction algorithm to the data entry using the data signature for the data entry, wherein the data signature for the data entry is ECC data stored in the BCAM.

13. The method of claim 12, wherein applying the error correction algorithm comprises:

determining whether an error in the data entry is correctable;

responsive to determining that the data entry has a correctable error, correcting the data entry using the ECC data stored in the BCAM; and responsive to determining that the data entry has a non-correctable error, outputting an error signal.

14. A binary content addressable memory (BCAM) comprising:

a memory array configured to store a data entry for a data word and a corresponding duplicate data entry for the data word;

a match module configured to compare the data entry to an input word to produce a first match output, and to compare the duplicate data entry to the input word to produce a second match output; and compare circuitry configured to compare the first and second match outputs.

15. The BCAM of claim 14, wherein the memory array comprises a plurality of memory rows, and wherein the data entry and duplicate data entry are stored in different memory rows that are separated by a number of memory rows, wherein a probability that ionizing radiation inserts errors in memory rows that are separated by the number of memory rows is lower than a threshold.

16. The BCAM of claim 14, wherein the memory array comprises a plurality of memory rows, and wherein the data entry and duplicate data entry are stored in different memory rows that are separated by at least four other memory rows.

17. The BCAM of claim 14, wherein if the compare circuitry indicates a mismatch between said match outputs, the BCAM takes corrective action and then retries comparison to the input word.

18. The BCAM of claim 17, wherein the corrective action comprises correcting the data entry and/or duplicate data entry.

19. The BCAM of claim 14, wherein if the compare circuitry indicates a mismatch between said match outputs, the BCAM outputs an error signal.

* * * * *